(No Model.) 3 Sheets—Sheet 2.
O. E. MEYER.
APPARATUS FOR TREATING SEWAGE.
No. 565,491. Patented Aug. 11, 1896.
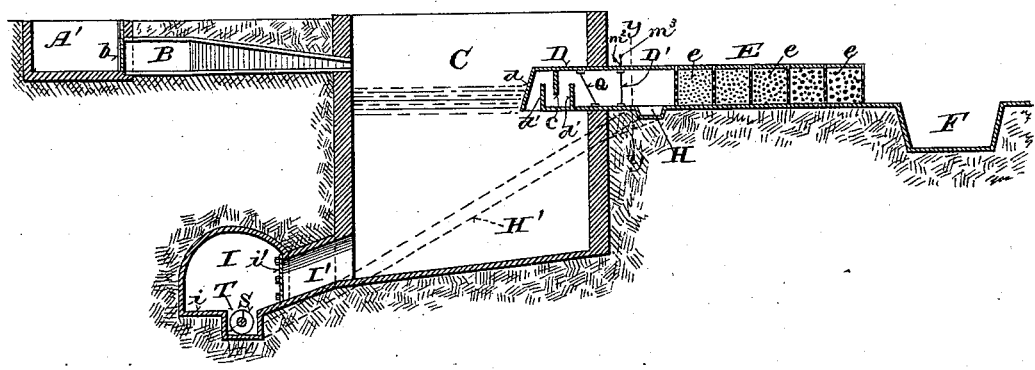
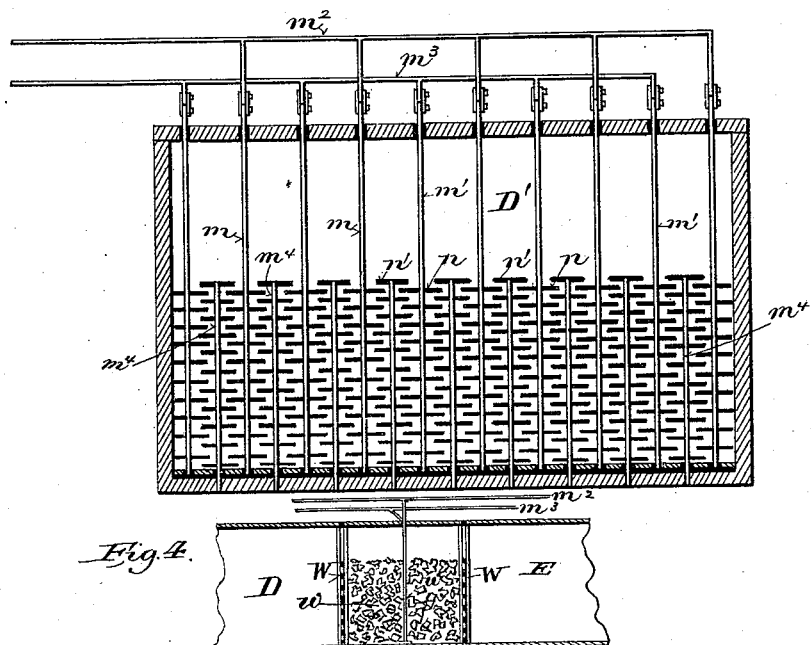

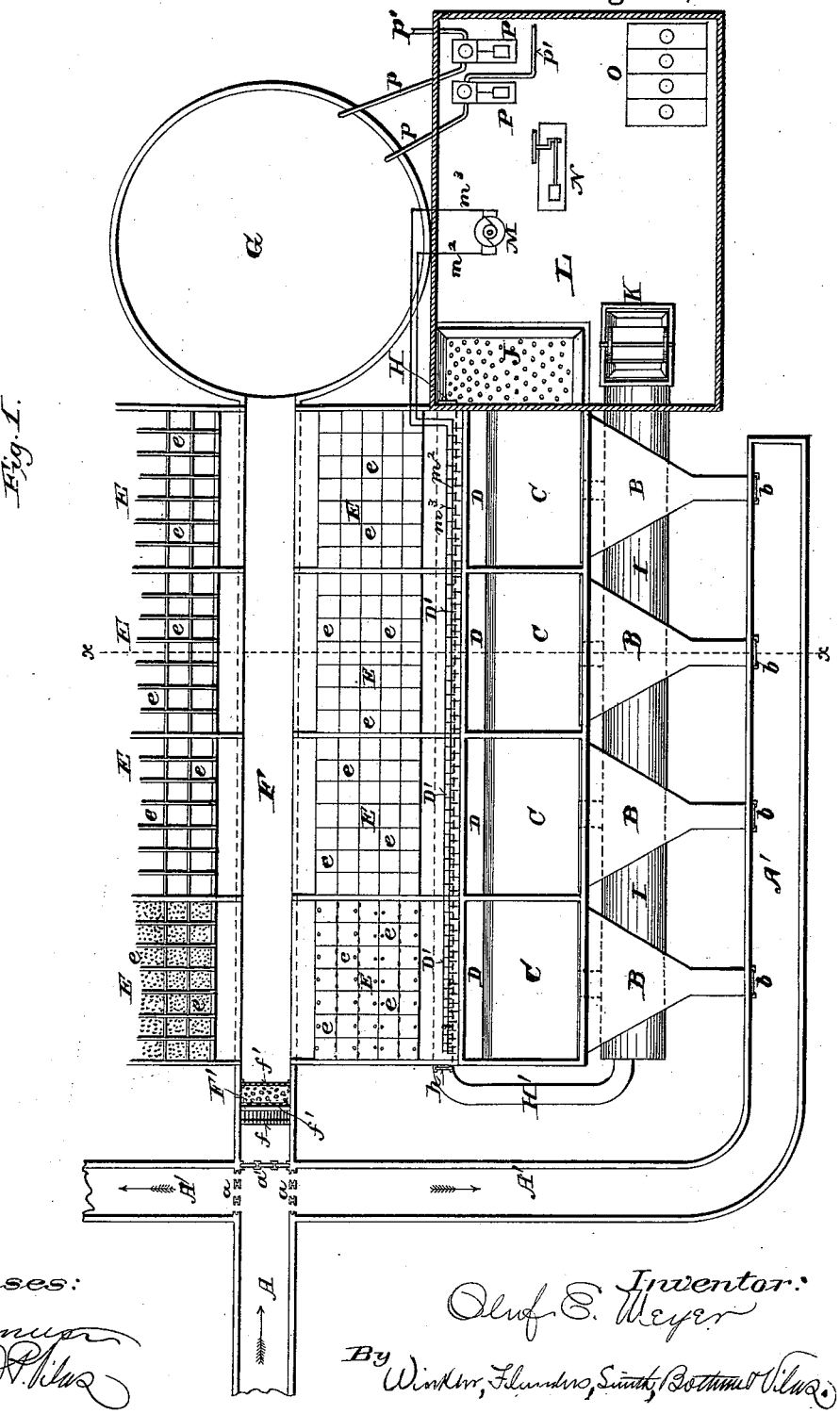

(No Model.) 3 Sheets—Sheet 3.
O. E. MEYER.
APPARATUS FOR TREATING SEWAGE.
No. 565,491. Patented Aug. 11, 1896.
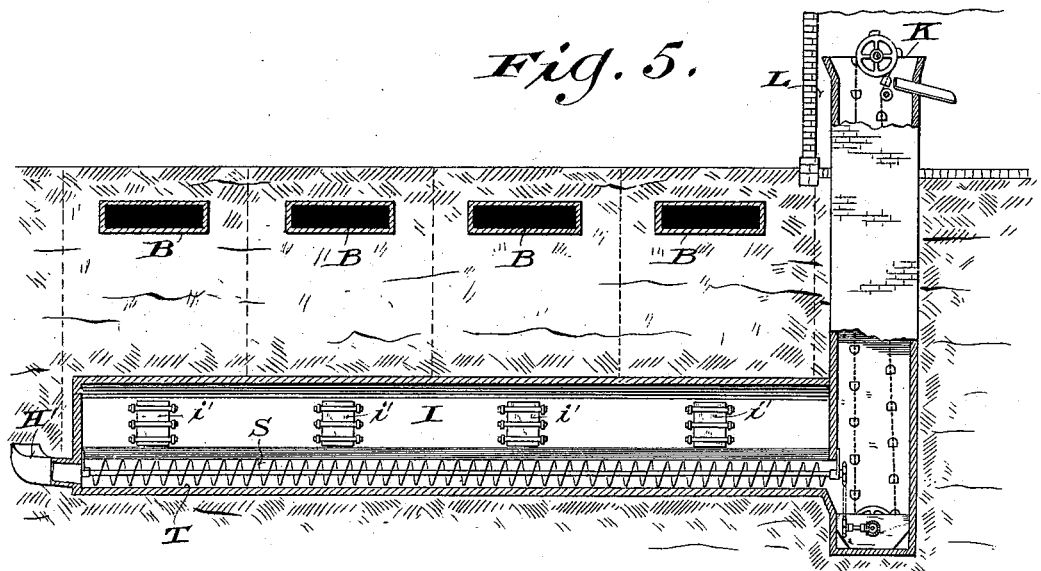
Fig. 5.
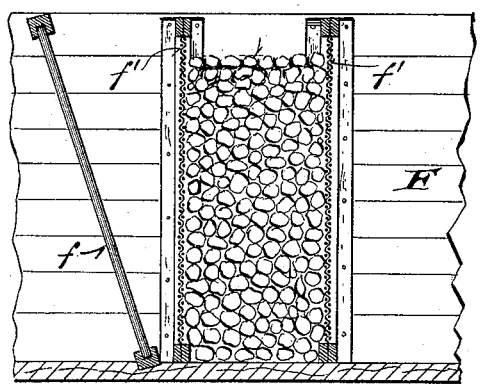
Fig. 6.
Fig. 7.
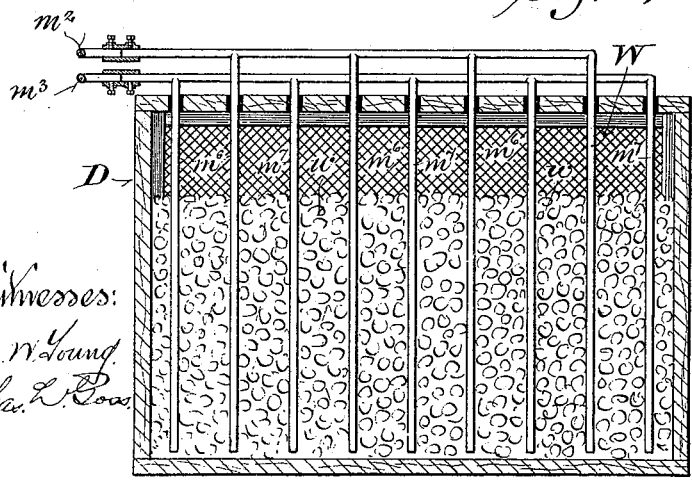
Fig. 8.
Witnesses:
Geo. W. Young
Chas. L. Poor
Inventor:
Oluf E. Meyer
By Winker, Flanders, Smith, Bottum & Vilas
Attorneys

UNITED STATES PATENT OFFICE.

OLUF E. MEYER, OF MILWAUKEE, WISCONSIN.

APPARATUS FOR TREATING SEWAGE.

SPECIFICATION forming part of Letters Patent No. 565,491, dated August 11, 1896.

Application filed March 4, 1890. Serial No. 342,598. (No model.)

*To all whom it may concern:*

Be it known that I, OLUF E. MEYER, of Milwaukee, in the county of Milwaukee and State of Wisconsin, have invented certain new and useful Improvements in Apparatus for Treating Sewage; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to separate the solid from the liquid part of sewage and to render the liquid from which the sludge has been separated innocuous and inoffensive.

It consists, essentially, of a series of settling tanks or vats, into which the sewage is discharged, and a series of filters communicating severally with the said settling tanks or vats, and an electrical screen or apparatus through which the liquid is caused to pass and by which the organic matter contained therein is oxidized and rendered odorless and harmless, and precipitation of certain matter contained in the sewage is produced, and of certain other peculiarities of construction and arrangement hereinafter particularly described, and pointed out in the claims.

Figure 1 is a plan view of my improved apparatus. Fig. 2 is a vertical cross-section on the line $xx$, Fig. 1. Fig. 3 is a transverse vertical section, on a greatly-enlarged scale, taken on the line $yy$, Fig. 2, of the electrical screen or apparatus for oxidizing the organic matter contained in the sewage. Fig. 4 is a longitudinal vertical section, on a smaller scale, of a modification of the electrical device shown in Fig. 3. Fig. 5 is a vertical longitudinal section on the line $zz$, Figs. 1 and 2. Fig. 6 is a vertical longitudinal section of the rack and filter-cage in the filter-discharge conduit. Fig. 7 is a perspective view of one of the electrodes of the electrical screen shown in Fig. 3; and Fig. 8 is an enlarged transverse vertical section of the device shown in Fig. 4.

A represents the sewer-main, and A' branches which are connected with the several settling-tanks C C by chutes B B, which are provided with gates $b\ b$, whereby the sewage may be admitted to or shut off from the several settling-tanks, as desired. At the junction of the branches A' A' with the sewer-main A, I provide gates $a\ a$, by which the sewage may be directed into or cut off from either branch, either wholly or partially, as desired.

E E are filter-boxes opening at one end into the settling-tank C C above the bottom thereof, preferably at a level somewhat below the level of the discharging ends of the chutes B B, which open into said settling-tanks on the opposite sides thereof. These filter-boxes are divided tranversely by upright screens into compartments $e\ e$, which are filled with suitable filtering and disinfecting materials, such as gravel, sand, broken limestone, comminuted charcoal, and the like, these several materials being placed in said compartments preferably in the order named.

I prefer to construct the settling-tanks C C side by side, of quadrangular form in horizontal section, and expand the chutes B B horizontally toward their discharging ends to nearly the full width of said settling-tanks, so that the sewage will be spread and its flow retarded as it is discharged into said settling-tanks, thereby affording a better opportunity for the sludge to settle and causing it to settle throughout the full width of said tanks. I also prefer to make the filter-boxes of the full width of the settling-tanks in order to obtain the greatest possible capacity. These filter-boxes, at their receiving ends, extend into the settling-tanks and are formed or provided with traps D D, by which the lighter substances and greasy scum which rises to the surface of the sewage is caught and prevented from passing into the filters and choking the same. Depending partition $c$, the lower edge of which projects below the level of the liquid maintained between the partitions $d'\ d'$, retains such substances and scum floating at the surface within the traps, from which they are removed from time to time. At their discharge ends, which are set a little lower than the intake ends, the filters open into a channel or conduit F, which empties at its lower end into a well or tank G in localities which do not afford a natural ravine or outlet for the same.

The conduit F preferably communicates with the sewer-main A, as shown in the drawings, for the purpose of disposing of an excessive flow of sewage caused by rain or snow whenever the capacity of the settling and filtering apparatus is insufficient or occasion may require. Upon such occasions the sewage is very much diluted by surface water and the excess of flow can be conducted into the well G or into any channel serving as an outlet for the effluent without objectionable consequences. At its junction with the sewer-main A the conduit F is provided with a gate or gates $a'$, by which the sewage is admitted into or excluded from said conduit F. I provide this conduit F, near its junction with the sewer-main, with a rack $f$ and with screens $f'$ $f'$, forming a cage F', which is filled with some coarse filtering material, so as to catch and retain the coarser impurities contained in the sewage.

I is a tunnel extending horizontally along and a little below the bottoms of the settling-tanks C C, which are preferably inclined downwardly toward it, as shown in Fig. 2, and are connected therewith by openings or branches I', which are provided with gates $i'$, accessible from the tunnel I.

T is a channel or trough provided with a conveyer S, extending lengthwise through the bottom of the tunnel I and serving to conduct the sludge drawn from the settling-tanks C to a suitable elevator K at the end of the tunnel, as shown in Figs. 1 and 5.

A walk or way $i$ is provided within the tunnel I along the side of the conveyer-trough T, so as to afford easy access to any part of the conveyer and to the several gates $i'$ $i'$.

The traps at the intake ends of the filter-boxes may be conveniently constructed, as shown in Fig. 2, in which $d$ represents the closed end of the filter-box, $d'$ $d'$ cross-partitions extending upwardly from the bottom a short distance apart and terminating at their upper edges a little above the middle of the filter-box, and $c$ a similar cross-partition depending from the top of the filter-box and terminating at its lower edge below the upper edges of the partitions $d'$, the intake-opening from the settling-tank being in the bottom of the filter-box between the closed end $d$ and the adjacent partition $d'$.

Q represents a rack located between the traps D and the electric screen, hereinafter described, so as to catch coarse light materials carried in the sewage. Between the traps D and the filters I place the electrical apparatus D' for oxidizing the organic matter contained in the sewage, which consists of a series of electrodes composed of insulated vertical rods $m$ $m'$, secured at their ends in a suitable frame at the top and bottom of the filter-boxes and provided with a series of cross-bars $n$ $n$, attached thereto in any suitable manner at the desired intervals. I prefer to make these vertical rods $m$ $m'$ of copper and the cross-bars of carbon, although any other suitable material may be employed. One set of rods, $m$ $m$, is detachably connected, as shown in Fig. 3, with a suitable conductor $m^2$ and the other set of rods, $m'$, is connected in like manner with a conductor $m^3$, these conductors connecting the several electrodes in parallel with the dynamo M or other suitable electric generator, as shown in Fig. 1. To obtain the complete or the best effect of the electric current upon the sewage, I prefer to provide in connection with the electrodes $m$ $m'$ vertical rods $m^4$, which communicate with the ground and alternate with the electrodes $m$ $m'$. These rods $m^4$ are preferably made of cast-iron and are provided with a series of short cross-bars $n'$ $n'$, which are also preferably made of iron and alternate with and project between the cross-bars $n$ $n$ of the electrodes $m$ $m'$, all together constituting a screen, with some part of which the liquid is brought in contact in passing.

I have found by experiment that the precipitation of impurities is much more marked and the efficiency of the apparatus is increased when the ground connections $m^4$ $m^4$ are employed.

The electrodes $m$ $m'$ have jointed connections $m^5$ $m^5$ with the conductors $m^2$ $m^3$, so that they may be detached therefrom and removed, either separately or together with the frame in which they are held, for the purpose of repairs, &c. I prefer to line the conduit in which these electrodes are placed with a coating of asphalt or some similar non-conducting material.

To dispose of the sediment produced by precipitation effected by the electrochemical action of the electric screen hereinbefore described, I provide a channel H, extending transversely through the bottom of the filter-boxes a little behind the electric screen, and having a connection, through a pipe H', with the conveyer-trough T in tunnel I. Communication between this channel H and the pipe H' is controlled by a gate $h$.

P P represent pumps connected by pipes $p$ $p$ with the well or cistern G, and $p'$ $p'$ are the eduction-pipes from the pumps leading to a stand-pipe, conduit, or other channel or receptacle into which the water is to be discharged.

N represents an engine for driving the dynamo M and the elevator K and any other machinery which may be employed in or about the apparatus.

O represents a boiler or series of boilers for supplying steam to the pumps P, &c.

J is a washing-vat for cleansing the filtering material employed in the filter-boxes E E, which are constructed with doors or movable sections in the top for affording easy access to the material in the various compartments therein. This material may be conveyed back and forth to the washing-vat J by cranes, tramway-cars, or any other suitable means. (Not shown.)

The engine, pumps, boiler, dynamo, elevator, and washing-vat, and any other machinery used in connection with the apparatus may be conveniently located near together and inclosed in a building L, as shown in Fig. 1.

In place of the construction and arrangement of the electrical screen shown in Fig. 3, I may employ the form shown in Figs. 4 and 8, in which the electrodes $m^6$ $m^7$ project into a compartment of the conduit filled or partially filled with coke $w$ or other similar material, inclosed by screens W W, extending transversely across the conduit, through which the effluent passes. The coke or other material employed in its place acts as a filtering agent to catch the impurities remaining in the sewage and such as are liberated and precipitated by the action of the electric current. In short, various changes may be made in the details of the apparatus, including the electrical device, without affecting its mode of operation or departing from the spirit of my invention.

I prefer to construct and arrange the settling-tanks and filters in two or more series, each supplied by a separate branch from the sewer-main, as shown in Fig. 1, in which a duplicate of the apparatus shown below the conduit F is partially shown above said conduit, so that while one section of the apparatus is in operation the other may be cut off for repairs or renewing the filtering and disinfecting material employed therein and removing the sludge from and cleansing the settling-tanks.

It is also desirable to have greater capacity of apparatus than is ordinarily required for the purpose of disposing of an unusual flow of sewage occasioned by rain and snow or other causes.

I claim—

1. In apparatus for treating sewage, the combination with a settling-tank of a chute through which the sewage is discharged into the same; said chute diverging horizontally toward its discharging end, to approximately the width of the settling-tank, and a filter opening into and leading out of the opposite side of the settling-tank, and of approximately the same width as said settling-tank, substantially as and for the purposes set forth.

2. The combination of a series of settling-tanks severally connected with the sewer, a like number of filters leading out of the several settling-tanks, a common discharge-conduit into which said filters open, a tunnel or shaft extending continuously along and below said tanks which are severally connected therewith by gate or valve controlled passages or openings, and conveying mechanism arranged to remove the sludge from said tunnel or shaft, substantially as and for the purposes set forth.

3. In apparatus for treating sewage, the combination with a series of settling-tanks, a conveyer-tunnel, extending horizontally alongside of and a little below the bottoms thereof, which are downwardly inclined toward said tunnel, passages severally connecting said tanks with said tunnel, and provided with gates, and conveying mechanism placed in said tunnel, and arranged to conduct the sludge drawn from said tanks to the desired point of deposit, substantially as and for the purposes set forth.

4. In apparatus for treating sewage, the combination with a series of settling-tanks, a conveyer-tunnel, extending horizontally alongside of and a little below the bottoms thereof, and severally connected therewith, conveying mechanism arranged to conduct the sludge drawn from said tanks to a suitable point of deposit, and elevating mechanism arranged to receive the sludge from said conveyer, substantially as and for the purposes set forth.

5. In apparatus for treating sewage, the combination of a series of settling-tanks, chutes connecting the sewer or a branch thereof with the several tanks, said chutes diverging toward their discharging ends, to approximately the width of said tanks, and each provided with a gate, filter-conduits opening out of the opposite sides of said tanks above the bottoms thereof, approximately of the same width of said tanks, a conveyer-tunnel extending alongside of and a little below the bottoms of said tanks, and severally connected therewith, and conveying mechanism arranged to conduct the sludge drawn from the tanks to a suitable point of deposit, substantially as and for the purposes set forth.

6. In apparatus for treating sewage, the combination with a settling-tank and a filter leading out of the same, of an electrical screen placed in the filter-conduit between the settling-tank and filter, and composed of alternating positive and negative electrodes between which the liquid of the sewage is caused to flow in passing from the settling-tank to the filter, substantially as and for the purposes set forth.

7. In apparatus for treating sewage, the combination of a settling-tank and a filter leading out of the same above the bottom thereof, and an electrical screen extending transversely across the filter-conduit between the settling-tank and filter, and composed of alternating electrodes of opposite polarity, and a transverse channel in the bottom of the filter-conduit between said screen and filter for catching and conducting off the sediment precipitated by the electrochemical action of said screen, substantially as and for the purposes set forth.

8. In apparatus for treating sewage, the combination with a settling-tank and a filter leading out of the same above the bottom thereof, of an electrical screen extending transversely across the filter-conduit and composed of parallel electrical conductors provided with cross-bars between which the liquid portion of the sewage is compelled to pass in flowing from the settling-chamber into the filter, substantially as and for the purposes set forth.

9. In apparatus for treating sewage, the combination with a conduit through which the sewage is caused to flow, of an electrical screen extending transversely across said conduit, and composed of alternating positive and negative electrodes having connections with opposite poles of an electric generator and intermediate conductors connected with the ground, substantially as and for the purposes set forth.

10. In apparatus for treating sewage, the combination of a series of settling-tanks severally connected with the sewer, filters leading out of the several settling-tanks, and a common discharge-conduit into which they empty, having a sewer connection, and a gate by which the sewage may be turned directly into said conduit and excluded from the settling-tanks and filters, substantially as and for the purposes set forth.

In testimony that I claim the foregoing as my own I affix my signature in presence of two witnesses.

OLUF E. MEYER.

Witnesses:
CHAS. L. GOSS,
E. E. ASMUS.